United States Patent Office 3,586,695
Patented June 22, 1971

3,586,695
SUBSTITUTED IMIDAZOLINYL INDOLES
Don V. Wysong and Halbert C. White, Midland, Mich., assignors to The Dow Chemical Company, Midland, Mich.
No Drawing. Filed Jan. 26, 1968, Ser. No. 700,733
Int. Cl. C07d 49/34
U.S. Cl. 260—309.6
14 Claims

ABSTRACT OF THE DISCLOSURE

Substituted imidazolinyl indole compounds such as 5-bromo-3-[(2 - imidazolin - 2 - yl)methyl]indole and their pharmaceutically-acceptable salts such as the hydrochloride and hydrobromide salts. The compounds are useful in the study of animal behavior and are particularly useful as antidepressants.

BACKGROUND OF THE INVENTION

Description of the prior art

The substituted indole compounds of the invention can be prepared by known reaction steps. A typical method which can be employed is the reaction of a substituted 3-indoleacetonitrile with ethylenediamine in a manner analogous to the method employed by Isler, U.S. Pat. No. 2,505,247 and by methods employed for the preparation of imidazolines such as those disclosed by Hartmann and Isler, Arch. Exptl. Path. Pharmakol., 192, 141–154 (1939), and Faust and Sahyun, U.S. Pat. No. 2,919,274.

SUMMARY OF THE INVENTION

This invention is concerned with substituted imidazolinyl indoles and is particularly directed to substituted [(2-imidazolin-2-yl)methyl]indoles and the pharmaceutically-acceptable salts thereof corresponding to the formula:

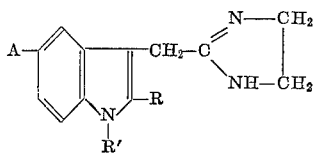

In the present specification and claims, A represents halogen or lower alkyl or lower alkoxy of from 1, to 2, to 3 carbon atoms and R and R′ each independently represent hydrogen or lower alkyl of from 1, to 2, to 3 carbon atoms. The terms "lower alkyl" and "lower alkoxy" thus include methyl, ethyl, propyl, methoxy, ethoxy and propoxy. The term "halo," as employed in the present specification and claims with respect to the substituted imidazolinyl indole compounds, refers to fluoro, chloro, bromo and iodo. The term "pharmaceutically-acceptable salt," as herein employed, refers to non-toxic salts of the substituted imidazolinyl indole compounds. Such pharmaceutically-acceptable salts include non-toxic acid addition salts with inorganic acids such as hydrochloric, hydrobromic, sulfuric or phosphoric acid, or with organic acids such as acetic, succinic, malic, maleic, tartaric or citric acid or with organic sulfonic acids such as methanesulfonic or p-toluenesulfonic acid. The imidazolinyl indole compounds are crystalline solids or liquids which are of varying degrees of solubility in organic solvents such as 1,2-dichlorobenzene, methylene chloride and alcohols and only slightly soluble in water. The pharmaceutically-acceptable salts of the novel compounds such as 5-bromo-3-[(2-imidazolin-2-yl)methyl]indole hydrobromide are soluble in water and slightly soluble in organic solvents such as acetone, benzene and alcohols.

The novel compounds are useful for administration to animals in studying the behavior thereof and in studying drug effects on the central and peripheral nervous system. They are particularly useful for administration to animals to alleviate symptoms of central nervous system depression. They can also be employed for the suppression of appetite in animals. For such uses, the compounds wherein at least one of R and R′ is hydrogen are preferred. Other preferred compounds are those wherein A is lower alkoxy or halo and both R and R′ are hydrogen. The compounds wherein A is halo have high therapeutic indices [ratio of 50 percent lethal dose (LD 50) to 50 percent effective dose (ED 50)] and are the preferred compounds for antidepressant use, 5-bromo-3-[(2-imidazolin-2-yl)methyl]indole being the compound of choice. For such uses, the preferred form of the imidazolinyl indole compounds is a pharmaceutically-acceptable salt thereof, although excellent results are also obtained when the free base is employed. When a pharmaceutically-acceptable salt is employed, the hydrohalide salts are preferred. Other salts, and particularly the tosylate (p-toluenesulfonate), can also be employed in the preparation and purification of the imidazolinyl indole compounds and such salts can be converted to the free base or to the hydrohalide salts.

The compounds of the invention are prepared by the reaction of a substituted 3-indoleacetic acid or a substituted 3-indoleacetonitrile with ethylenediamine p-toluenesulfonate to form a substituted 3-[(2-imidazolin-2-yl)methyl]indole p-toluenesulfonate salt, and the subsequent hydrolysis of the p-toluenesulfonate salt in aqueous base to liberate the imidazolinyl indole compound as a free base.

The sbstituted 3-indoleacetonitrile starting material can be prepared by known procedures, for example, by mixing a substituted indole with formaldehyde and dimethylamine in acetic acid to prepare a substituted gramine. The substituted gramine is reacted with iodomethane to prepare a substituted gramine methoiodide. The substituted gramine methoiodide is then reacted with excess sodium cyanide in water at a temperature of about 70°–90° C. for about °.5–3 hours. The resulting substituted 3-indoleacetonitrile can be separated by extraction with a halogenated hydrocarbon solvent and evaporation of the solvent.

The reaction of the substituted indoleacetonitrile or 3-indoleacetic acid with ethylenediamine p-toluenesulfonate proceeds when the substituted 3-indoleacetonitrile or 3-indoleacetic acid and the ethylenediamine p-toluenesulfonate are mixed together, preferably in an inert organic solvent as a reaction medium. Representative and suitable inert organic solvents which can be employed as reaction media include alkylbenzenes such as o-, m- and p-xylene and halo-benzenes such as 1,2-dichlorobenzene. When a substituted 3-indoleacetonitrile is employed as a starting material, ammonia is evolved during the reaction. In such cases, the reaction is preferably carried out under an inert atmosphere by passing nitrogen through the mixture to carry off the ammonia of reaction. When a substituted 3-indoleacetic acid is employed, the reaction can be carried out under a nitrogen atmosphere, if desired. With either starting material, the reaction proceeds readily at temperatures from about 150° to about 180° C. and is preferably carried out under reflux at the boiling temperature of the reaction mixture. The substituted imidazolinyl indole product precipitates in the reaction mixture as the p-toluenesulfonate salt and the salt can be separated by conventional methods as filtration, centrifugation or decantation.

The product can be obtained as the free base by hydrolysis of the p-toluenesulfonate salt in aqueous base such as aqueous sodium hydroxide solution. The free base imidazolinyl indole is then separated by extraction with an organic solvent such as methylene chloride or chloroform, followed by evaporation of the solvent. The product can be purified by conventional methods such as recrystallization, or it can be converted to a pharmaceutically-acceptable salt.

The pharmaceutically-acceptable salts of the imidazolinyl indole compounds can be prepared by dissolving the free base in a minimal amount of alcohol and adding an anhydrous acid such as hydrochloric or hydrobromic acid or an alcohol solution of an acid such as hydrochloric acid, hydrobromic acid, malic acid, maleic acid or succinic acid until precipitaton of the corresponding salt is complete. The salt can be further purified by conventional procedures such as recrystallization or washing, and the salt thus purified can be administered to animals. The salt can also be hydrolyzed to prepare the free base.

The free base imidazolinyl indole can be prepared by hydrolysis of the pharmaceutically-acceptable salt thereof in aqueous base. The salt is mixed with at least a molar equivalent of sodium hydroxide in aqueous solution, after which the free base can be separated by extraction with a chlorinated hydrocarbon solvent. The solvent can be removed by conventional methods such as evaporation or distillation and the imidazolinyl indole can be purified by conventional methods such as recrystallization and washing. The purified compound can then be administered to animals. The free base can also be converted to a pharmaceutically-acceptable salt.

In preparing the compounds of the invention, a substituted 3-indoleacetonitrile or a substituted 3-indoleacetic acid, ethylenediamine p-toluenesulfonate and an inert organic solvent, preferably 1,2-dichlorobenzene, are mixed together. The exact proportions of the reactants to be employed are not critical, some of the desired product being obtained when the reactants are combined in any proportions. However, the reaction consumes the reactants in equimolar proportions and the use of the reactants in such proportions is preferred. The mixture is then heated at a temperature within the reaction temperature range for about 1 to 10 hours. When a substituted 3-indoleacetonitrile is employed, nitrogen is passed through the mixture during the reaction period and in a convenient procedure, the reaction vessel is vented to a trap containing aqueous hydrochloric acid to react with the ammonia of reaction. The reaction mixture is then cooled and filtered. The substituted imidazolinyl indole p-toluenesulfonate filter cake can be further purified by recrystallization or it can be converted to the free base by hydrolysis in aqueous base.

DESCRIPTION OF THE PREFERRED EMBODIMENTS

The following examples illustrate the invention but are not to be construed as limiting the same.

Example 1

Thirty milliliters of 37 percent aqueous formaldehyde solution and 80 milliliters of 25 percent aqueous dimethylamine are mixed together and stirred at a temperature of 0° C. A solution of 5-bromoindole (69 grams; 0.36 mole) in 360 milliliters of dioxane is added to the resulting mixture over a period of 40 minutes. The mixture is maintained at a temperature of 0° C. throughout the addition. The reaction mixture is evaporated in vacuo and the residue is dissolved in methylene chloride. The methylene chloride solution is then washed with an aqueous solution of sodium hydroxide having a pH of 12. The washed solution is concentrated by evaporation in vacuo. The residue is crystallized from 200 milliliters of isopropanol and the 5-bromogramine product is found to melt at 155°–157° C.

5-bromogramine (29 grams; 0.11 mole) is dissolved in 300 milliliters of acetone. Iodomethane (100 grams; 0.7 mole) is added to the resulting solution over a 40 minute period at a temperature of 25° C. The 5-bromogramine methoiodide product precipitates in the reaction mixture and is separated by filtration.

5-bromogramine methoiodide (24 grams; 0.048 mole), sodium cyanide (24 grams; 0.49 mole) and 430 milliliters of water are mixed together and heated with stirring at a temperature of 84° C. for two hours. The mixture is then cooled and extracted with methylene chloride. The methylene chloride extract is evaporated in vacuo and the 5-bromo-3-indoleacetonitrile is found to melt at 95°–97° C.

In substantially the same procedure and employing the same solvents and an appropriate substituted indole, starting materials such as 5-fluoro-3-indoleacetonitrile,
5-chloro-3-indoleacetonitrile,
5-methyl-3-indoleacetonitrile,
5-methoxy-3-indoleacetonitrile,
5-iodo-3-indoleacetonitrile,
5-chloro-2-methyl-3-indoleacetonitrile,
5-fluoro-2-methyl-3-indoleacetonitrile,
5-bromo-2-methyl-3-indoleacetonitrile,
2,5-dimethyl-3-indoleacetonitrile,
5-methoxy-2-methyl-3-indoleacetonirtile,
5-ethyl-3-indoleacetonitrile,
5-ethoxy-3-indoleacetonitrile and
5-bromo-2-ethyl-3-indoleacetonitrile can be prepared.

Example 2

The 5-bromo-3-indoleacetonitrile of Example 1 (11.8 grams; 0.05 mole) is mixed with ethylenediamine p-toluenesulfonate (11.8 grams; 0.05 mole) and 50 milliliters of 1,2-dichlorobenzene. Nitrogen is passed through the mixture while the mixture is heated at the boiling temperature under reflux for about five hours. The ammonia of reaction is collected by passing the exit gases through a gas scrubber and the ammonia of reaction is neutralized with dilute aqueous hydrochloric acid. The reaction mixture is cooled and the solvent is decanted off to obtain 5-bromo-3-[(2-imidazolin-2-yl)methyl]indole p-toluenesulfonate, having a molecular weight of 450, as a residue. The 5-bromo-3-[(2-imidazolin-2-yl)methyl]indole p-toluenesulfonate is mixed with a mixture of methylene chloride and water and the mixture is made basic (pH 12) by the addition of aqueous sodium hydroxide solution. The methylene chloride layer is separated and evaporated in vacuo. The residue is crystallized from chloroform to prepare the free base 5-bromo-3-[(2-imidazolin-2-yl)methyl]indole as a crystalline solid having a molecular weight of 278. The free base product is dissolved in isopropanol and anhydrous hydrogen bromide is added to the solution until precipitation is complete. The mixture is filtered and the 5-bromo-3-[(2-imidazolin-2-yl)methyl]indole hydrobromide product is collected as a filter cake. The product is found to melt at 210°–211° C. and to have a nuclear magnetic resonance spectrum consistent with the assigned structure.

In substantially the same procedure described above and employing similar inert organic solvents, 5-bromo-3-[(2-imidazolin-2-yl)methyl]indole hydrochloride, having a molecular weight of 315, is prepared by substituting excess hydrogen chloride for hydrogen bromide in the procedure described above.

Example 3

5-chloro-2-methyl-3-indoleacetic acid (11.2 grams; 0.05 mole) is mixed with ethylenediamine p-toluenesulfonate (11.8 grams; 0.05 mole) and 50 milliliters of 1,2-dichlorobenzene. Nitrogen is passed through the mixture while the mixture is heated at the boiling temperature under reflux for about five hours. The reaction mixture is cooled and the solvent decanted to obtain 5-chloro-2-methyl-3-[(2-imidazolin-2-yl)methyl]indole p-toluenesulfonate, having a molecular weight of 420, as a residue. The residue is then mixed with a mixture of methylene chloride and water and the mixture is made basic (pH 12) by the addition of aqueous sodium hydroxide solution. The organic layer is evaporated in vacuo to leave the free base 5-chloro-2-methyl - 3 - [(2-imidazolin-2-yl)methyl]indole, having a molecular weight of 248, as a residue. The 5-chloro-2-methyl-3 - [(2-imidazolin-2-yl)methyl]indole is dissolved in about 100 milliliters of isopropanol and excess anhydrous hydrogen chloride is added to the solution until precipitation is complete. The mixture is filtered and the 5-chloro-2-methyl-3-[(2-imidazolin-2-yl)methyl]indole hydrochloride product is collected as a filter cake and found to melt at 283°–285° C. The structure of the product is confirmed by nuclear magnetic resonance spectroscopy.

In substantially the same procedure described above and employing similar inert organic solvents, 5-chloro-2-methyl-3-[(2-imidazolin-2-yl)methyl]indole hydrochloride can also be prepared by substituting 5-chloro-2-methyl-3-indoleacetonitrile for 5-chloro-2-methyl-3-indoleacetic acid in the above-described procedure.

Example 4

In substantially the same procedure as described above with respect to Example 2, the following substituted imidazolinyl indole compounds are prepared.

5 - methoxy - 3 - [(2 - imidazolin - 2-yl)methyl]indole, melting at 98°–100° C., is prepared by mixing together equimolar proportions of 5-methoxy-3-indoleacetonitrile and ethylenediamine p-toluenesulfonate in 1,2-dichlorobenzene and heating the mixture at reflux for from 1 to 10 hours. The reaction mixture is cooled and the solvent decanted off to obtain 5-methoxy-3-[(2-imidazolin-2-yl)-methyl]indole p-toluenesulfonate, having a molecular weight of 401, which is then hydrolyzed in aqueous sodium hydroxide solution to obtain the free base.

5 - methyl - 3-[(2-imidazolin-2-yl)methyl]indole, melting at 135°–137° C., is prepared by mixing together equimolar proportions of 5-methyl-3-indoleacetonitrile and ethylenediamine p-toluenesulfonate in 1,2-dichlorobenzene and heating the mixture at reflux for from 1 to 10 hours. The 5-methyl-3-[(2-imidazolin-2-yl)methyl]indole p-toluenesulfonate, having a molecular weight of 385, is separated by decantation to remove the solvent and hydrolyzed with aqueous sodium hydroxide solution to obtain the free base.

5 - fluoro - 3 - [(2 - imidazolin - 2 - yl)methyl]indole, melting at 119°–121° C., is prepared by mixing together equimolar proportions of 5-fluoro-3-indoleacetonitrile and ethylenediamine p-toluenesulfonate in 1,2 - dichlorobenzene. The reaction mixture is heated at the boiling point for from 1 to 10 hours, cooled and the solvent is removed by decantation. The 5-fluoro-3-[(2-imidazolin-2-yl)methyl]indole p-toluenesulfonate, having a molecular weight of 389, is hydrolyzed with aqueous sodium hydroxide solution to obtain the free base.

Example 5

In substantially the same procedure as described in Examples 2 and 4, the following substituted imidazolinyl indole compounds are prepared by the reaction of a substituted 3-indoleacetonitrile with ethylenediamine p-toluenesulfonate followed by the hydrolysis of the substituted imidazolinyl indole p-toluenesulfonate salt with aqueous sodium hydroxide solution.

5 - methoxy - 2 - methyl - 3 - [(2 - imidazolin - 2 - yl) methyl]indole, having a molecular weight of 243, is prepared by employing 5-methoxy - 2 - methyl - 3 - indoleacetonitrile in the procedure described above.

5 - bromo - 2 - methyl - 3 - [(2 - imidazolin - 2 - yl) methyl]indole, having a molecular weight of 292, is prepared by employing 5 - bromo-2-methyl - 3 - indoleacetonitrile in the procedure described above.

5 - fluoro - 2 - methyl - 3 - [(2 - imidazolin - 2 - yl) methyl]indole, having a molecular weight of 231, is prepared by employing 5 - fluoro-2-methyl - 3 - indoleacetonitrile in the procedure described above.

5 - iodo - 3 - [(2 - imidazolin - 2 - yl)methyl]indole, having a molecular weight of 325, is prepared by employing 5-iodo-3-indoleacetonitrile in the procedure described above.

5 - iodo - 2 - methyl - 3 - [(2 - imidazolin - 2 - yl)methyl]indole, having a molecular weight of 339, is prepared by employing 5 - iodo-2-methyl-3-indoleacetonitrile in the procedure described above.

5 - ethoxy - 3 - [(2 - imidazolin - 2 - yl)methyl]indole, having a molecular weight of 243, is prepared by employing 5-ethoxy-3-indoleacetonitrile in the procedure described above.

5 - chloro - 2 - propyl - 3 - [(2 - imidazolin - 2 - yl) methyl]indole, having a molecular weight of 275, is prepared by employing 5-chloro-2-propyl-3-indoleacetonitrile in the procedure described above.

5 - bromo - 2 - ethyl - 3 - [(2 - imidazolin - 2 - yl) methyl]indole, having a molecular weight of 306, is prepared by employing 5-bromo-2-ethyl-3-indoleacetonitrile in the procedure described above.

5 - propoxy - 3 - [(2 - imidazolin - 2 -yl)methyl]indole, having a molecular weight of 257, is prepared by employing 5-propoxy-3-indoleacetonitrile in the procedure described above.

5 - bromo - 2 - propyl - 3 - [(2 - imidazolin - 2 - yl) methyl]indole, having a molecular weight of 320, is prepared by employing 5-bromo-2-propyl-3-indoleacetonitrile in the procedure described above.

5 - iodo - 2 - ethyl - 3 - [(2 - imidazolin - 2 - yl)methyl]indole, having a molecular weight of 353, is prepared by employing 5-iodo - 2 - ethyl-3-indoleacetonitrile in the procedure described above.

In substantially the same procedure as described in Examples 2 and 3, the following substituted pharmaceutically-acceptable salts of representative imidazolinyl indole compounds of the invention are prepared by treating an alcohol solution of a substituted 3-imidazolinyl indole compound in the free base form with excess acid until precipitation of the resulting pharmaceutically-acceptable salt is complete.

5 - chloro - 2 - methyl - 3 - [(2 - imidazolin - 2 - yl) methyl]indole acetate, having a molecular weight of 308, is prepared by treating 5-chloro-2-methyl-3-[(2-imidazolin-2-yl)methyl]indole with excess acetic acid in the procedure described above.

5 - bromo - 3 - [(2 - imidazolin - 2 - yl)methyl]indole malate, having a molecular weight of 412, is prepared by treating 5-bromo-3-[(2-imidazolin - 2 - yl)methyl]indole with excess malic acid in the procedure described above.

5 - fluoro - 3 - [(2 - imidazolin - 2 - yl)methyl]indole hydrochloride, having a molecular weight of 254, is prepared by treating 5-fluoro-3-[(2-imidazolin-2-yl)methyl] indole with excess hydrogen chloride in the procedure described above.

5 - methoxy - 3 - [(2 - imidazolin - 2 - yl)methyl]indole tartrate, having a molecular weight of 379, is prepared by treating 5-methoxy-3-[(2 - imidazolin - 2 - yl)methyl] indole with excess tartaric acid in the procedure described above.

5 - bromo - 3 - [(2 - imidazolin - 2 - yl)methyl]indole citrate, having a molecular weight of 470, is prepared by treating 5-bromo-3-[(2-imidazolin - 2 - yl)methyl]indole with excess citric acid in the procedure described above.

5 - iodo - 3 - [(2 - imidazolin - 2 - yl)methyl]indole hydrochloride, having a molecular weight of 231, is prepared by treating 5 - iodo-3-[(2-imidazolin-2-yl)methyl]indole with excess hydrogen chloride in the procedure described above.

5-bromo-3-[(2-imidazolin-2-yl)methyl]indole maleate, having a molecular weight of 394, is prepared by treating 5-bromo-3-[(2-imidazolin-2-yl)methyl]indole with excess maleic acid in the procedure described above.

Example 6

1-methyl-3-indoleacetonitrile is prepared by the addition of 2.5 grams of sodium to 200 milliliters of liquid ammonia in the presence of 0.1 gram ferric nitrate and adding a mixture of 15.6 grams of 3-indoleacetonitrile and 20 milliliters of ether to the mixture. Sixteen grams of methyl iodide are then added to the mixture and the ammonia is evaporated. The residue is mixed with methylene chloride, the methylene chloride mixture is washed with water and the 1-methyl-3-indoleacetonitrile is separated by evaporation of the solvent.

In substantially the same procedure as described above with respect to Example 2, 1-methyl-3-[(2-imidazolin-2-yl)methyl]indole is prepared by mixing together 1-methyl-3-indoleacetonitrile (13.5 grams; 0.08 mole), ethylenediamine p-toluenesulfonate (20 grams; 0.08 mole) and 100 milliliters of 1,2-dichlorobenzene. The resulting mixture is heated at the boiling point under reflux for five hours. The resulting 1-methyl-3-[(2-imidazolin-2-yl)methyl]indole p-toluenesulfonate, having a molecular weight of 385, precipitates in the reaction mixture. The mixture is cooled and the p-toluenesulfonate salt product is separated by extraction with dilute aqueous hydrochloric acid. The aqueous hydrochloric acid extract is made basic by the addition of aqueous sodium hydroxide solution and the mixture is extracted with methylene chloride. The methylene chloride extract is evaporated in vacuo and the 1-methyl-3-[(2-imidazolin-2-yl)methyl]indole product is obtained as a viscous oil having a molecular weight of 213. The free base product is dissolved in 1,2-dimethoxyethane and the solution is treated with hydrogen chloride until precipitation is complete. The mixture is filtered and the 1-methyl-3-[(2-imidazolin-2-yl)methyl]indole hydrochloride product is collected as a filter cake. The product is found to melt at 222°–224° C. The structure of the product is confirmed by analysis of chloride content and by nuclear magnetic resonance spectroscopy.

In substantially the same procedure as described above, the following substituted imidazolinyl indole compounds are prepared by the reaction of a substituted 3-indoleacetonitrile with ethylenediamine p-toluenesulfonate followed by the hydrolysis of the substituted imidazolinyl indole p-toluenesulfonate salt with aqueous sodium hydroxide solution.

1-ethyl-3-[(2-imidazolin-2-yl)methyl]indole, having a molecular weight of 227, is prepared by employing 1-ethyl-3-indoleacetonitrile in the procedure described above.

1-propyl-3-[(2-imidazolin-2-yl)methyl]indole, having a molecular weight of 241, is prepared by employing 1-propyl-3-indoleacetonitrile in the procedure described above.

5-bromo-1-methyl-3-[(2-imidazolin-2-yl)methyl]indole, having a molecular weight of 292, is prepared by employing 5-bromo-1-methyl-3-indoleacetonitrile in the procedure described above.

5-bromo-1,2-dimethyl-3-[(2-imidazolin-2-yl)methyl]indole, having a molecular weight of 306, is prepared by employing 5-bromo-1,2-dimethyl-3-indoleacetonitrile in the procedure described above.

5-fluoro-1-methyl-3-[(2-imidazolin-2-yl)methyl]indole, having a molecular weight of 231, is prepared by employing 5-fluoro-1-methyl-3-indoleacetonitrile in the procedure described above.

The compounds of the invention can be administered to animals in the study of the behavior thereof and in the study of drug effects on the central and peripheral nervous system thereof. The compounds are typically administered to animals at dosages from as low as about 10 micrograms per kilogram of animal body weight to as high as about 50 milligrams per kilogram of animal body weight, depending upon the particular compound or pharmaceutically-acceptable salt thereof employed and upon such factors as age, species, size and physical condition of the animal, route of administration and the effect to be produced. The compounds are preferably administered as compositions comprising one or more compounds of the invention and one or more pharmaceutical excipients including inert diluents, dispersing agents, binders, lubricants, wetting agents and the like. The substituted imidazolinyl indole compounds can be administered orally in the form of tablets, capsules, elixirs, syrups, emulsions, dispersible powders and the like, or by injection in the form of sterile injectable suspensions or solutions.

The compounds of the invention are useful as antidepressants as indicated by their potentiation of amphetamine toxicity in aggregated rodents and by their antagonism of reserpine. They are also useful for the suppression of appetite in animals.

Antidepressant activity of the new compounds was indicated by antagonism of reserpine-induced depression in mice. In representative operations, representative substituted imidazolinyl indole compounds were administered to separate groups of mice at various dosage rates by intraperitoneal injection. The mice were observed for 30 minutes following administration of the test compounds, during which time their behavior appeared normal. Thirty minutes after the administration of the substituted imidazolinyl indole compound, reserpine was administered to each mouse by intraperitoneal injection at a dosage rate of 5 milligrams per kilogram. The administration of 5 milligrams per kilogram of reserpine intraperitoneally to mice results in a progression of signs with drooping of the eyelids (ptosis) and pilo-erection and culminating in a generalized depression with decreased spontaneous motor activity and decreased responsiveness to auditory or tactile stimuli.

Following the administration of the reserpine, the test animals were observed for the above signs of depression. An antagonism of reserpine-induced depression was indicated when the mice were observed to exhibit normal spontaneous motor activity and normal responsiveness to stimuli with an absence of ptosis. The dosage of representative substituted imidazolinyl indole compounds effective to antagonize reserpine-induced depression in 50 percent of the mice (ED 50) was calculated. 5-bromo-3-[(2-imidazolin-2-yl)methyl]indole hydrobromide was found to have an ED 50 of 180 micrograms per kilogram. 5-fluoro-3-[(2-imidazolin-2-yl)methyl]indole and 5-methyl-3-[(2-imidazolin-2-yl)methyl]indole were found to have ED 50's of 35 and 410 micrograms per kilogram, respectively. The ED 50 for 5-chloro-2-methyl-3-[(2-imidazolin-2-yl)methyl)]indole hydrochloride was found to be 74 micrograms per kilogram.

While the substituted imidazolinyl indoles of the invention exhibit similar pharmacological properties, they have been found to be unpredictably different in many respects. For example, 5-fluoro-3-[(2-imidazolin-2-yl)methyl]indole was found to be approximately 100 times as potent as 5-methoxy-3-[(2-imidazolin-2-yl)methyl]indole in the antagonism of reserpine-induced depression as described above. The toxicity of the novel compounds has also been found to vary unpredictably from one compound to another, 5-methoxy-3-[(2-imidazolin-2-yl)methyl]indole having an intraperitoneal LD 50 of about 100 milligrams per kilogram while 5-methyl-3-[(2-imidazolin-2-yl)methyl]indole has been found to have an LD 50 of about 12 milligrams per kilogram by the same route. Similarly, 5-bromo-3-[(2-imidazolin-2-yl)methyl]indole hydrobromide was found to have an LD 50 of 147 milligrams per kilogram while 5-fluoro-3-[(2-imidazolin-2-yl)methyl]indole and 5-chloro-2-methyl-3-[(2-imidazolin-2-yl)methyl]indole hydrochloride have LD 50's of 18 and 15 milligrams per kilogram, respectively.

What is claimed is:

1. A member of the group consisting of substituted imidazolinyl indole compounds and the pharmaceutically-acceptable salts thereof, the compounds corresponding to the formula

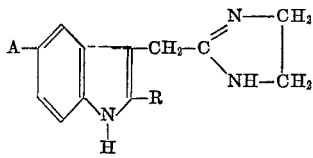

wherein A represents a member of the group consisting of halo and lower alkoxy of from 1 to 3 carbon atoms, inclusive, and R represents a member of the group consisting of hydrogen and lower alkyl of from 1 to 3 carbon atoms, inclusive.

2. The compound of claim 1 wherein the compound is 5-halo-3-[(2-imidazolin-2-yl)methyl]indole.

3. The compound of claim 2 wherein the compound is 5-bromo-3[(2-imidazolin-2-yl)methyl]indole.

4. The compound of claim 2 wherein the compound is 5-fluoro-3-[(2-imidazolin-2-yl)methyl]indole.

5. The compound of claim 1 wherein the compound is 5 - halo-3-[(2-imidazolin-2-yl)methyl]indole p-toluenesulfonate.

6. The compound of claim 5 wherein the compound is 5 - bromo-3-[(2-imidazolin-2-yl)methyl]indole p-toluene-sulfonate.

7. The compound of claim 5 wherein the compound is 5 - fluoro-3-[(2-imidazolin-2-yl)methyl]indole p-toluenesulfonate.

8. The compound of claim 1 wherein the compound is 5-halo-2-methyl-3-[(2-imidazolin-2-yl)methyl]indole.

9. The compound of claim 8 wherein the compound is 5-chloro-2-methyl-3-[(2-imidazolin-2-yl)methyl]indole.

10. The compound of claim 1 wherein the compound is 5 - halo-2-methyl-3-[(2-imidazolin-2-yl)methyl]indole p-toluenesulfonate.

11. The compound of claim 10 wherein the compound is 5-chloro-2-methyl-3-[(2-imidazolin-2-yl)methyl]indole p-toluenesulfonate.

12. The compound of claim 1 wherein the compound is 5 - bromo-3-[(2-imidazolin-2-yl)methyl]indole hydrobromide.

13. The compound of claim 1 wherein the compound is 5-chloro-2-methyl-3-[(2-imidazolin-2-yl)methyl]indole hydrochloride.

14. The compound of claim 1 wherein the compound is 5-methoxy-3-[(2-imidazolin-2-yl)methyl]indole.

References Cited

UNITED STATES PATENTS

| | | | |
|---|---|---|---|
| 2,505,247 | 4/1950 | Isler | 260—309.6 |
| 2,751,393 | 6/1956 | Schindler et al. | 260—309.6 |
| 2,752,358 | 6/1956 | Ehrhart et al. | 260—309.6 |

OTHER REFERENCES

Hartmann et al., Chem. Abst., vol. 34, columns 4068–9 (1940). QD1.A51.

Küng et al., Experientia, vol. 15, pp. 66–9 (1959). Q1.A1E9.

NATALIE TROUSOF, Primary Examiner

U.S. Cl. X.R.

260—326.13, 326.15, 326.16, 999